Feb. 21, 1967 N. LAING 3,305,665
FORCED CIRCULATION ELECTRIC HEATER
EMPLOYING CROSS-FLOW TYPE FAN
Original Filed Nov. 17, 1959 5 Sheets-Sheet 1

United States Patent Office 3,305,665
Patented Feb. 21, 1967

3,305,665
FORCED CIRCULATION ELECTRIC HEATER EMPLOYING CROSS-FLOW TYPE FAN
Nikolaus Laing, Stuttgart, Germany, assignor, by mesne assignments, to Laing Vortex, Inc., New York, N.Y.
Original application Nov. 17, 1959, Ser. No. 853,596. Divided and this application Aug. 16, 1965, Ser. No. 479,808
1 Claim. (Cl. 219—370)

This invention relates to fans of the cross-flow type. The application is a division of my copending application Serial No. 853,596 filed November 17, 1959, now abandoned.

The invention more particularly concerns fans of the cross-flow type, that is, machines comprising a cylindrical bladed rotor mounted for rotation about its axis in a predetermined direction and defining an interior space, and guide means defining with the rotor an entry region and a discharge region, the guide means and rotor cooperating on rotation of the latter in said predetermined direction to induce a flow of air from the entry region through the path of the rotating blades of the rotor to said interior space and thence again through the path of said rotating blades to the discharge region. More especially but not exclusively, the invention concerns fans of the cross-flow type wherein the guide means and rotor cooperate to set up a vortex of Rankine character having a core region eccentric of the rotor axis and a field region which guides the air so that flow through the rotor is strongly curved about the vortex core: such fans are sometimes known as "tangential" fans and the preferred form of fan to be described in detail later is of this type.

The invention is more especially concerned with fan heaters employing cross-flow fans. A cross-flow fan heater according to the invention has guide means in the form of a pair of end walls in substantial alignment with the ends of the rotor and a pair of guide walls, these walls defining a discharge duct mounting heater means, generally, but not necessarily, an electric resistance element extending within the duct.

The cross-flow fan is relatively compact and capable of passing a relatively large volume of air through the discharge duct, which can take up a correspondingly large amount of heat. On the other hand it is generally undesirable, especially in a domestic heater, for the heating means to reach an excessive temperature. In one aspect of the invention the heater means is mounted on the discharge duct to extend at an angle to the direction of air flow therethrough, so as to extend over a greater area than the cross-sectional area of the duct taken perpendicularly to the flow direction. The discharge duct is moreover preferably divergent in the direction of flow, which has the twin effects of increasing the static pressure of the air to overcome such resistance to flow as the heating means may offer, and increasing further the area which the heating means may occupy. These measures allow the designer relative freedom to provide for substantial heating of the air flow with a relatively cool heating means. The spacing and arrangement of the resistance wire, if such is used, has been found to make a considerable difference to the resistance to flow and the turbulence of the emergent jet, as will be explained. The arrangement of the heating means as just described gives scope to dispose the resistance wire or its equivalent to the best advantage.

In a further aspect of the invention, the heating means is mounted for movement between a retracted position wherein air flow through the discharge duct is unobstructed by the heater means and an operative position wherein the heater means is located in the path of said air flow. This is particularly advantageous if the fan has to operate for periods without the heater e.g. for air circulation purposes in summer.

The tangential fan as above defined tends to produce in the outlet duct a flow which is faster adjacent one guide wall than adjacent the other, due to the fact that the flow in the vortex field is faster near the core than remote from it. In one aspect of the invention based on this realization, the heating element has resistance wires more closely spaced adjacent this one wall where the flow is faster than adjacent the other wall.

In a further aspect of the invention the ends of the rotor are received in recesses in the end walls so that adjacent these walls the air can flow more smoothly.

The invention will be further described with reference to the accompanying somewhat diagrammatic drawings illustrating, by way of example only, various embodiments of the invention. In the drawings.

Figure 1:
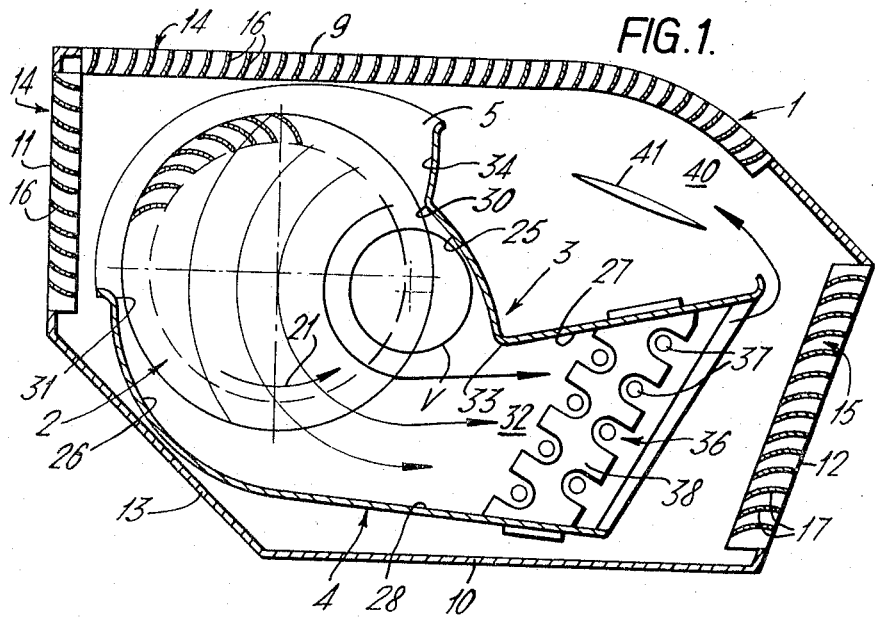
FIGURE 1 shows in vertical section one form of cross-flow fan heater according to the invention.
Figure 2:
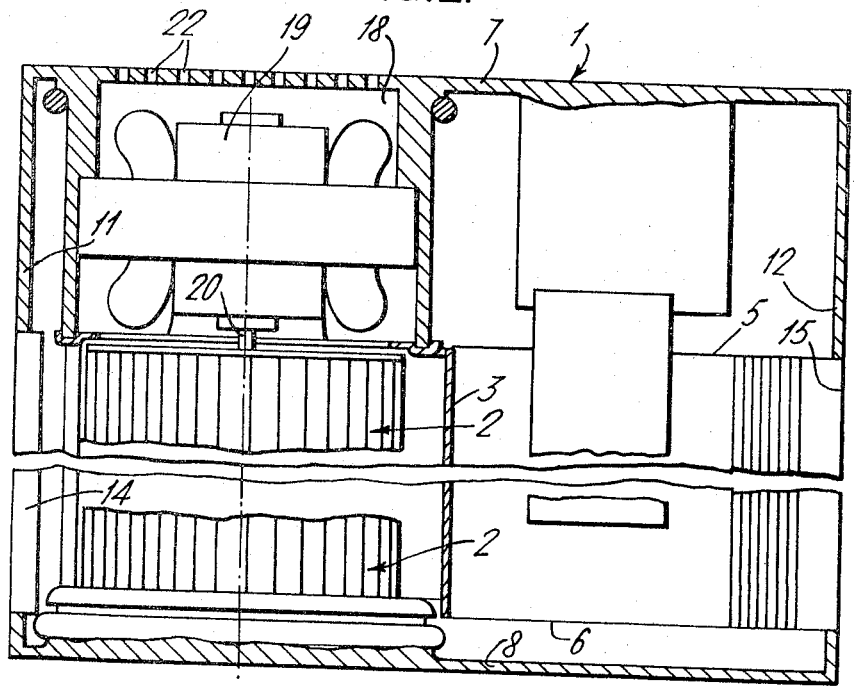
FIGURE 2 is a partly cut-away horizontal section of the FIGURE 1 fan heater showing certain parts in plan view.

Referring to the drawings, the fan heater illustrated in FIGURES 1 and 2 thereof comprises a casing 1 enclosing a cross-flow fan unit comprising a rotatably mounted cylindrical bladed rotor 2 and a pair of guide walls 3, 4 interconnected by parallel end walls 5, 6 all these walls 3, 4, 5, 6 being held spaced from the interior of the casing. The casing 1 has end walls 7, 8 and top and bottom walls 9, 10, a vertical left hand wall 11 (as viewed in FIGURES 1 and 2) and an upwardly and outwardly sloping right hand wall 12: a sloping wall portion 13 joins the lower edge of the wall 11 to the bottom wall 10, while the top wall 9 slopes down at the right hand side to point the upper edge of the wall 12; in any horizontal cross-section the casing has a rectangular outline. An air inlet 14 to the casing 1 is provided over adjacent areas of the side wall 11 and top wall 9 which lie opposite the rotor 2. An air outlet 15 is provided over an area of the side wall 12 opposite the rotor 2. Curved vanes 16, 17 extend longitudinally across inlet and outlet 14, 15 to prevent manual contact respectively with the rotor 2 and with heater means to be described.

The casing 1 provides on the inside of the end wall 7 an inwardly-opening recess 18 snugly receiving and locating a fractional horsepower electric motor 19 the shaft 20 of which supports one end of the rotor 2 and drives it in the direction of the arrow 21. At the bottom of the recess 18 the end wall 7 is perforated at 22 for access of cooling air to the motor 19.

The guide walls 3, 4 which extend the length of the rotor 2, each have a main portion 25, 26 and an outlet guide portion 27, 28. The main guide portions 25, 26 of the guide walls face each other across the rotor 2 and are spaced therefrom an appreciable distance at their lines of nearest approach thereto, designated 30, 31 which define a nearly 180° arc of air entry to the rotor. In the example shown, the main guide portion 25 converges with the rotor in the direction of rotor rotation shown by the arrow 21. The outlet guide portions 27, 28 of the guide walls 3, 4 are straight and diverge in the direction of flow to form an outlet duct 32, in this embodiment acting as a diffuser and discharging directly towards the outlet 15. The main guide and outlet portions 25, 27 of the guide wall 3 meet in a nose 33 and define thereat an angle of just over a right angle. The main guide and outlet portions 26, 28 of the wall 4 merge in a smooth surface diverging steadily from the line 31 of nearest approach to the rotor. The wall 3 includes a lead-in portion 34 guiding air to the rotor 2. The edges of the guide walls 3, 4 terminate in spaced relation to the casing 1 adjacent the inlet 14 and outlet 15.

In operation, the rotor 2 and guide walls 3, 4 cooperate to set up vortex having, adjacent the wall 3, a generally cylindrical core parallel to and eccentric of the rotor axis and interpenetrating the rotor blades. This vortex core is a rotating body of air and the outermost, and fastest, stream tube thereof is diagrammatically indicated at V in FIGURE 1. By reason of the vortex a flow of air is set up through the casing which passes from the inlet 14, twice through the path of the rotating blades of the rotor 2, through the diffuser 32 and out through the outlet 15. The vortex causes the air to travel through the rotor 2 along lines which are curved about the vortex core V, the greater part of the throughput being concentrated in the more strongly curved and faster flow lines adjacent the core. Thus because of the vortex the air is turned through the angle subtended at the rotor by the outlet 15 and that part of the inlet 14 through which the air chiefly passes, and this turning of the air is unaccompanied by the losses which would occur if it had been accomplished in bent ducting.

An electric heating element 36, comprising a plurality of resistance wires 37 held in castellated insulating supports 38, is mounted within the diffuser 32 between the guide walls 3 and 4. The wires 37 may be closer together adjacent the wall 3 where the flow is faster.

The guide wall 3 is, as already mentioned, spaced from the interior of the casing 1. The space 40 defined between the wall 3 and the casing enables air which has passed through the rotor 2 to return to the entry arc thereof, in case the inlet 14 or outlet 15 should be blocked. The inlet 14 extends over a part of this space 40, so that in normal operation there is always some air flow through it from the inlet 14 to the rotor 2. Within the space 40, and in the air flow just mentioned, there is mounted a thermostat 41 connected electrically with the heater element 36. By adjustment of the thermostat 41 the heater element 36 can be cut in and out as required to maintain a desired temperature in a room in which the fan heater is placed, and will be quick in responding to temperature change by reason of the air flow over it from the inlet 14 to the rotor 2. If the inlet 14 or outlet 15 is blocked while the heater element 36 is in circuit, the recirculating flow of heated air through the space 40 will immediately cause the thermostat 41 to cut out the heater element. This arrangement thus obviates the need for a separate safety switch to cut out the element 36 on overheating.

FIGURES 3 to 8 show various forms of fan heater unit, i.e. combinations of rotor, guide walls and heater means, which can be built into a casing of some sort to form a fan heater in the general manner explained with reference to FIGS. 1 and 2, or which can form part of some other apparatus requiring a stream of warm air. Vertical sections only are shown: the horizontal sections will be similar in principle to that of FIG. 2. In FIGS. 3 to 8 the reference numerals of FIGS. 1 and 2 will be used for similar parts, which will not require further detailed description.

Figure 3:
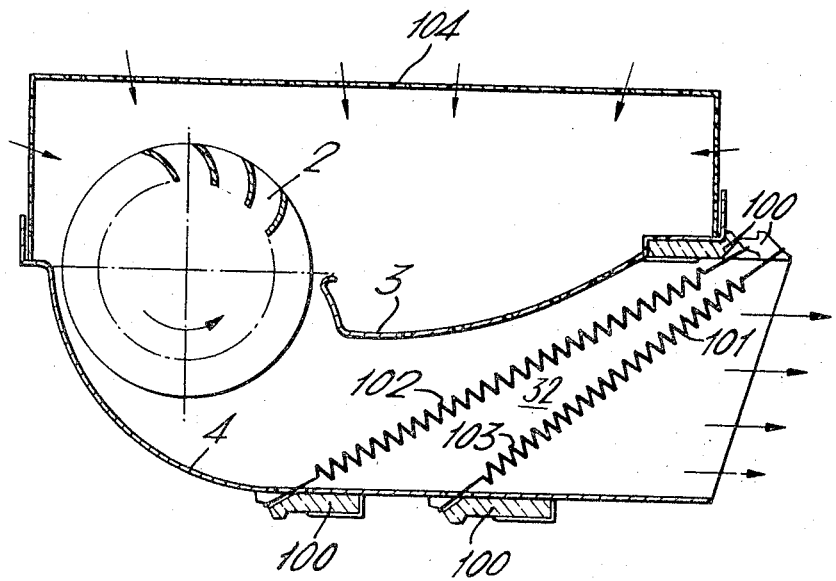
FIGURE 3 is a vertical section of a second embodiment of a cross flow fan heater according to the invention.

FIG. 3 shows a fan unit where the guide walls 3, 4 carry notched insulating support members 100 extending parallel to the rotor axis between which coiled resistor wire 10 is strung in two layers designated 102, 103, which extend obliquely across the diverging outlet duct 32. By running the wire in the manner shown, the heat dissipation of the wires is greater near the wall 3, where the air velocity is greater since it comes from adjacent the vortex core region. The resistor wire 101 extends over a very large area compared to the cross-sectional area of the outlet duct taken in a plane perpendicular to flow. An apertured cover 104 is supported on the guide walls 3, 4. The guide wall 3 is itself apertured for flow of air between the inlet region and the outlet duct 32.

Figure 4:
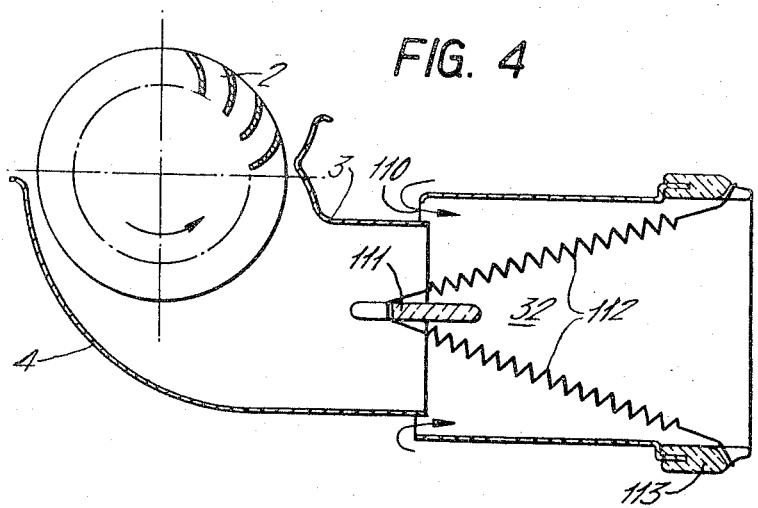
FIGURE 4 is a vertical section of a third embodiment of part of a cross flow fan heater constructed according to the invention.

In the arrangement of FIG. 4 the guide walls 3, 4 are formed in two sections providing an outlet duct 32 with an abrupt increase of cross-section, at which openings 110 are provided. Air flowing in the outlet duct 32 induces a certain amount of ambient air to flow into the duct through these openings. The air velocity adjacent the guide wall 3 is greater than at the wall 4 because of the vortex (flow lines of which are shown in FIG. 1), and accordingly the injector effect is greater adjacent wall 3. For this reason the openings 110 are larger at this side of the outlet duct. A notched insulating support member 111 extends parallel to the rotor within the outlet duct 32 midway between the walls 3, 4 in the region of the abrupt increase of cross-section. Coiled resistor wire 112 is strung between the support member 111 and two other notched insulating support members 113 at the down stream extremities of the walls 3, 4. As in the FIG. 3 embodiment, the wire thus extends over a much greater area than the cross-sectional area of the duct 32.

Figure 5:
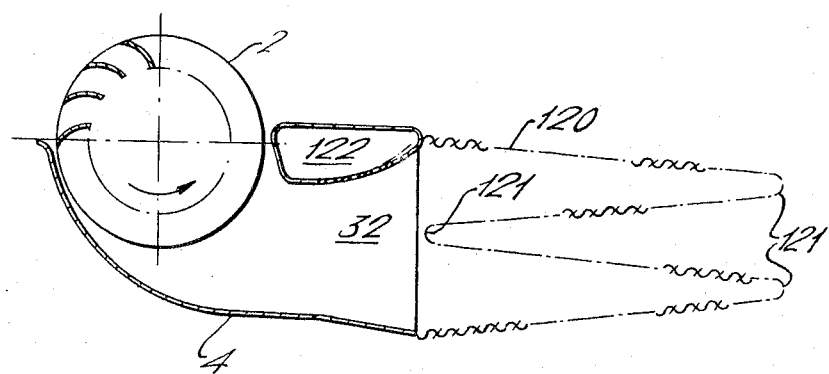
FIGURE 5 is a vertical section of a fourth embodiment of part of a cross flow fan heater constructed according to the invention.

In FIG. 5 the electric heating element 120 has the form of a textile material e.g. woven from resistance wire and insulator filaments, the latter maintaining the wires in spaced relation. The element 120 is supported on the downstream extremities of the guide walls 3, 4 and, at least when the rotor 2 is rotated to set up an air flow, the element extends like a bag over the outlet end of the outlet duct 32. As shown the element is formed with folds 121, and the area which is presented to the air flow is thus once again much greater than that of the cross-section of the duct 32 taken on a plane perpendicular the direction of air flow in the duct. The divergent part of the guide wall 3 is apertured to provide for air flow from the duct 32 into a channel 122 formed behind the wall 3 and leading to the motor: in this way cooling air is supplied to the motor.

Figure 6:
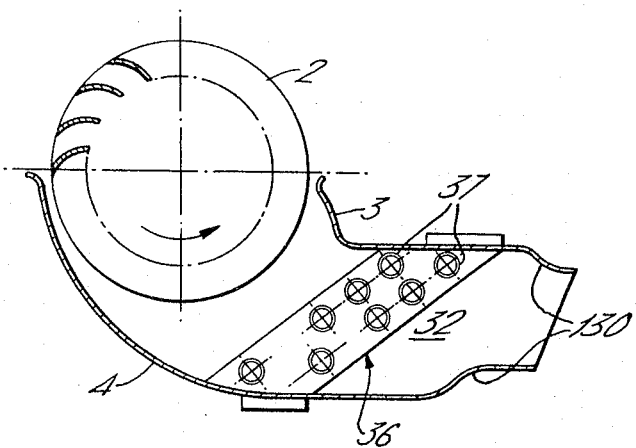
FIGURE 6 is a vertical section of a fifth embodiment of part of a cross flow fan heater constructed according to the invention.

FIG. 6 shows a further form of cross flow fan with heater. The outlet duct 32 is in this case parallel-sided with a constriction at 130 downstream of the heater element 36 which is mounted obliquely across the outlet duct 32 and which in construction is generally similar to that of FIG. 1. It will be understood from reference to FIG. 1 that the flow in the outlet duct 32 is fastest adjacent the wall 3 and becomes slower going across the duct to the wall 4: this is because in a Rankine vortex such as is set up in the rotor on operation of the fan the fastest stream tubes are adjacent the vortex core V and on leaving the rotor such stream tubes flow adjacent the wall 3, while going away from the core, i.e. towards the wall 4, the flow becomes progressively slower. The heater wires 37 are more closely spaced in the region of the wall 3 to take account of the difference in flow speed across the duct whereby, despite this, to heat the air flow evenly. The constriction 130 helps to ensure a smooth outlet jet.

Figure 7:
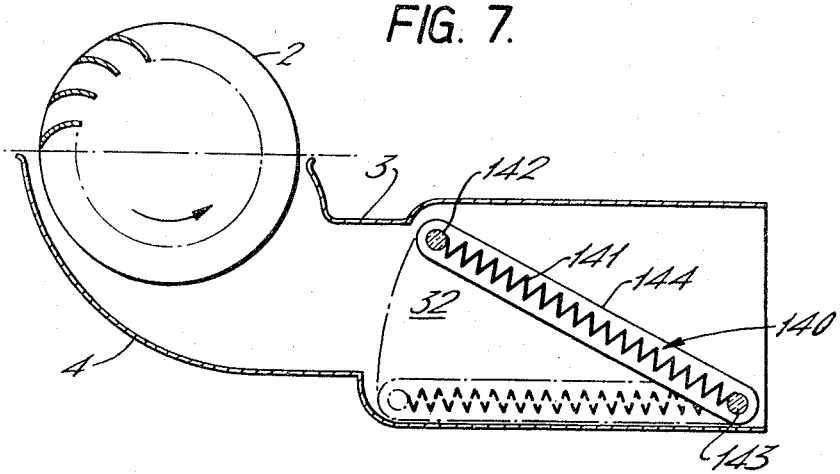
FIGURE 7 is a vertical section of a sixth embodiment of part of a cross flow fan heater constructed according to the invention.

In the cross-flow fan with heater shown in FIG. 7, the heater element 140 comprises a coiled resistor wire 141 strung between opposite insulator members 142, 143 of an open rectangular frame 144. The frame 144 is pivoted adjacent the member 143 about an axis close to the extremity of guide wall 4, and can move from a retracted position (shown dotted) adjacent the wall 4 to an operative position (shown in full lines) wherein the frame member 144 lies obliquely across the outlet duct 32. The FIG. 7 fan has the advantage that when it is required to produce a stream of cold air the heater element 140 can be moved to its retracted position wherein it offers no resistance to flow. A bimetal element (not shown) can be provided to pivot the heater element 140 into the air flow under the action of heat developed when the element is switched on.

As in the embodiments described earlier, those of FIGS. 6 and 7 have heating elements which extend over an area greater than the cross-sectional area of the outlet duct.

Figure 8:
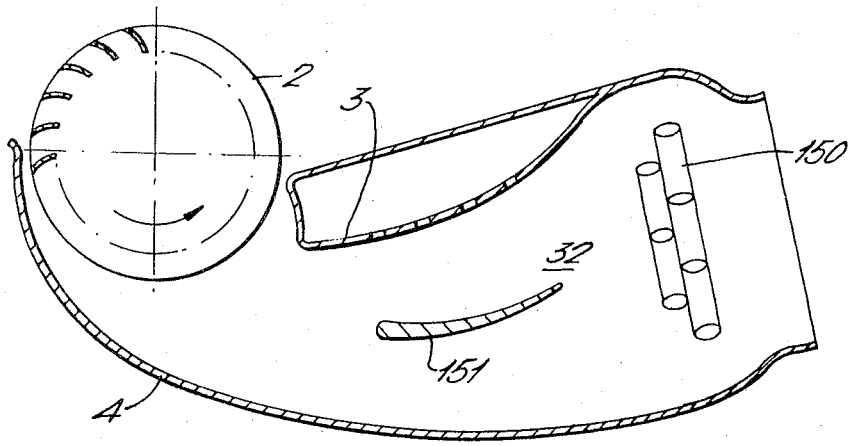
FIGURE 8 is a vertical section of a seventh embodiment of part of a cross flow fan heater constructed according to the invention.

FIG. 8 shows a cross flow fan with a long outlet duct 32 which diverges going from the rotor 2 but converges at its downstream end. At the widest part of the duct 32 is mounted an indirectly heated electric element 150. When the apparatus is switched off there may be a considerable amount of heat stored in the heater element 150. To prevent this heat from damaging the rotor, which may be of a plastics material, a baffle 151 is arranged in the outlet duct 32, which, when the fan is operating, serves as a flow guide. As in FIG. 6, the convergence of the duct 32 at its downstream end helps to promote laminar flow.

Figure 9A:
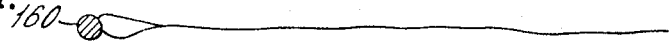
FIGURES 9a, 9b and 9c show schematically the effect of different conditions on the turbulence of flow past a resistance wire.
Figure 9B:
Figure 9C:

In all the heater elements of FIGS. 1 to 7, it is desirable to ensure that the size spacing of adjacent wires falls within a particular range. Thus it has been found that the Reynolds number (Re) defined as follows:

$$Re = \frac{(\text{diameter of wire}) \times (\text{Speed of air flow})}{\text{kinematic viscosity}}$$

should be below 60. FIG. 9a shows purely diagrammatically a wire 160 of a heater element in an arrangement where the Reynolds number is well below 60: flow is more or less laminar. At a higher Reynolds number, shown in FIG. 9b, flow conditions are slightly disturbed, where the Reynolds number greatly exceeds 60, as shown in FIG. 9c, the conditions are turbulent and energy is wasted in random eddies, resulting in reduced throughput and an outlet jet of impaired penetrative power. It is also necessary to space adjacent wires by substantially more than the wire diameter since otherwise the boundary layers of the wires merge into each other and the element becomes virtually impermeable.

Figure 10:
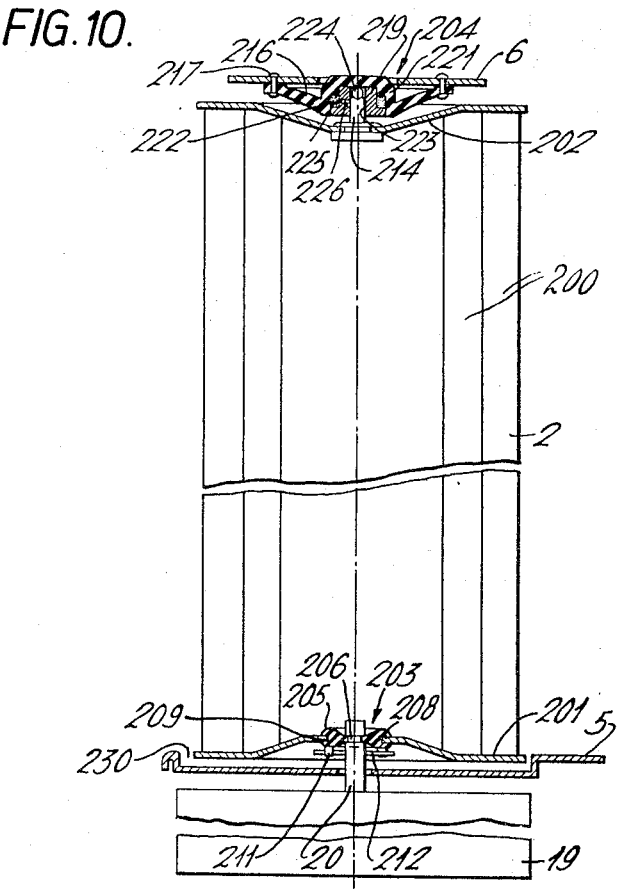
FIGURE 10 is a sectional view illustrating mounting arrangements for the FIGURE 1 rotor.

FIGURES 1 to 8 do not show the specific means by which the rotor 2 is rotatably mounted. One form of such means is illustrated in FIGURE 10; parts shown in FIGURE 10 which are similar to those of FIGURES 1 and 2 are designated by the same reference numerals and will not need further description.

The rotor 2 comprises a series of blades 200 extending parallel to the rotor axis and arranged in a ring thereabout to define an unobstructed interior space, the blades 200 being mounted on rotor end members 201, 202 of sheet material and generally of disc formation. The driven rotor end member 201 is coupled to the shaft 20 of the drive motor 19 by a drive connection 203, and the end member 202 at the nondriven end of the rotor 2 is rotatably mounted from the stationary end wall 6 of the fan.

The drive connection 203 comprises a flexible ring or bushing 205 preferably made of soft rubber and having a central portion of reduced thickness which engages a portion 206 of reduced diameter on the shaft 20 of the drive motor 19. The drive 205 has a grooved periphery 208 which grips the opposite faces adjacent an aperture 209 in the rotor end support member 201. Lugs 211 integral with the ring 205 and projecting therefrom are arranged to engage in pin 212 secured to the shaft 20 to rotate the rotor 2 upon rotation of the shaft. To reduce the axial length of the rotor the end support member 201 is inwardly dished.

By providing sufficient frictional engagement between the ring 205 and the portion 206 of reduced diameter on the shaft 20 the lug 211 and pin 212 can be dispensed with.

The supporting means 204 for the other end of the rotor 2 comprises a stub shaft 214 rigidly secured to the rotor end member 202, a flexible generally conical diaphragm 216 secured at its thickened periphery by means of rivets 217 to the wall 6 and a bearing 219 secured to the central portion of the diaphragm 216, the stub shaft 214 being journalled in the bearing 219. The central portion of the rotor end member 202 is inwardly dished at 220 and the stub shaft 214 is secured to this dished portion, which accommodates most of the axial length of the diaphragm 216, stub shaft 214 and bearing 219 thus reducing the distance between the end of the rotor 2 and the mounting plate 6. The diaphragm 216 is, in this embodiment, made of rubber with the central portion of increased thickness at 221, this central portion having a recess 222 into which the bearing 219 is fitted. A cylindrical bore 223 of the bearing 219 receives the stub shaft 214, which has a spherical depression for receiving a ball 224 located in the closed end of the bore 223 to provide an end limit stop for the shaft 214.

The ring or bushing 205 and the diaphragm 116 are both capable of accommodating substantial universal movement without imposing braking torques, and thus minor misalignments of rotor 2, drive shaft 20 and end wall 6 will not interfere with the proper operation of the fan. Moreover, both the diaphragm 216 and the ring or bushing 205—particularly when the lugs 211 and pin 212 are omitted—can accommodate also appreciable variation in the axial spacing of the parts. The diaphragm 216 can also compensate for a minor degree of eccentricity or misalignment of the stub shaft 214 relative to the true axis of the rotor. Thus the rotor 2 is mounted in a manner whereby even substantial inaccuracies of manufacture, such as may occur in economic quantity production, do not affect the successful operation of the fan.

Moreover, it will be seen that the rotor mounting arrangement described permits the rotor to be assembled within the guide wall structure by simple manual manipulation after insertion of the rotor through the wide opening between the guide walls 3, 4 on their inlet side.

FIG. 10 shows a further important feature of the invention which is the formation of a circular recess 230 in the end wall 5 within which is located the end disc 101 of the rotor 2, the surfaces presented to air flow by the wall 5 and the end disc 101 being flush with one another. This arrangement, which can also be adopted at the other end of the rotor, reduces the disturbance to air flow and improves the operation of the fan.

I claim:

A fan heater comprising: a casing having an inlet and an outlet; a bladed cylindrical rotor within the casing said rotor defining an interior space; means mounting the rotor for rotation about its axis: drive means to rotate the rotor in a predetermined direction; guide means comprising a pair of end walls in substantial alignment with the ends of the rotor and a pair of spaced guide walls extending generally parallel to the rotor axis between the end walls, said guide means defining an entry region communicating with the inlet and a discharge duct leading directly to the outlet, the guide means and rotor cooperating on rotation of the latter in said predetermined direction to induce a flow of air from the entry region through the path of the rotating blades to the interior space and thence again through the path of the rotating blades to the discharge duct, heater means including an electric resistor element mounted within the discharge duct, means forming an air by-pass passage within the casing between the discharge duct and the entry region, and a thermostat effective to control current supply to the resistor element, the thermostat being located in the entry region and in the path of air flow from the discharge duct through said by-pass passage on blocking of the outlet.

References Cited by the Examiner

UNITED STATES PATENTS

| | | | |
|---|---|---|---|
| 1,626,400 | 4/1927 | Frank. | |
| 1,679,841 | 8/1928 | Shaw | 219—375 X |
| 1,823,579 | 9/1931 | Anderson. | |
| 1,920,952 | 8/1933 | Anderson. | |
| 2,458,268 | 1/1949 | Hinds | 219—370 X |
| 2,822,674 | 2/1958 | Simmons. | |
| 2,988,626 | 6/1961 | Buttner | 219—375 X |
| 3,035,760 | 5/1962 | Simmons. | |

FOREIGN PATENTS 757,543  9/1956  Great Britain.

ANTHONY BARTIS, *Primary Examiner.*